(12) United States Patent
Tüllmann et al.

(10) Patent No.: US 10,343,244 B2
(45) Date of Patent: Jul. 9, 2019

(54) CHAIN LINK FOR A LINK CHAIN AND TOOL MAGAZINE WITH LINK CHAIN

(71) Applicant: DECKEL MAHO SEEBACH GMBH, Seebach (DE)

(72) Inventors: Udo Tüllmann, Eisenach (DE); Stephan Kümmel, Eisenach (DE); Andreas Kretzschmar, Cunewalde (DE); Andreas Heumann, Pöhl (DE)

(73) Assignee: DECKEL MAHO SEEBACH GMBH, Seebach (DE)

( * ) Notice: Subject to any disclaimer, the term of this patent is extended or adjusted under 35 U.S.C. 154(b) by 403 days.

(21) Appl. No.: 15/013,587

(22) Filed: Feb. 2, 2016

(65) Prior Publication Data
US 2016/0221137 A1    Aug. 4, 2016

(30) Foreign Application Priority Data
Feb. 2, 2015    (DE) .......................... 10 2015 201 779

(51) Int. Cl.
*B23Q 3/157*    (2006.01)
*B23Q 11/00*    (2006.01)
(Continued)

(52) U.S. Cl.
CPC ...... *B23Q 3/15724* (2016.11); *B23Q 3/15526* (2013.01); *B23Q 3/15746* (2013.01);
(Continued)

(58) Field of Classification Search
CPC ............ B23Q 3/15746; B23Q 3/15724; B23Q 2003/15531; B23Q 3/155–3/15793; Y10T 483/1836; Y10T 483/1891
(Continued)

(56) References Cited

U.S. PATENT DOCUMENTS 4,404,728 A * 9/1983 Ishikawa ............ B23Q 3/15713
483/13
4,709,455 A * 12/1987 D'Andrea ............. B23B 39/205
409/144
(Continued)

FOREIGN PATENT DOCUMENTS

CZ       299562 B6 *  9/2008
DE      2754636 A1 *  6/1979
(Continued)

OTHER PUBLICATIONS

May 5, 2017 Extended Search Report issued in European Patent Application No. 16153955.6.
(Continued)

*Primary Examiner* — Erica E Cadugan
(74) *Attorney, Agent, or Firm* — Oliff PLC (57) ABSTRACT

A chain link includes a base area, confined by four sides, and first to third link portions respectively on first to third sides. The first and second link portions respectively receive first and second connection elements for connecting the chain link to first and second adjacent chain links, and respectively and relatively define first and second rotational axes of adjacent first and second chain links. The third link portion receives a third connection element for connecting the chain link to a tool receptacle and defines a third rotational axis of a rotary motion of the tool receptacle in relation to the chain link. The first and second axes define a first plane, the first plane is parallel to the chain link base area, and the third axis lies outside the first plane. A tool magazine for a machine tool includes a link chain from chain links for the tool transport.

16 Claims, 9 Drawing Sheets (51) Int. Cl.
*B23Q 3/155* (2006.01)
*F16G 15/12* (2006.01)

(52) U.S. Cl.
CPC ............ *B23Q 11/005* (2013.01); *F16G 15/12* (2013.01); *B23Q 2003/15531* (2016.11); *Y10T 483/15* (2015.01); *Y10T 483/1836* (2015.01); *Y10T 483/1891* (2015.01)

(58) Field of Classification Search
USPC ..................................................... 483/68, 62
See application file for complete search history.

(56) References Cited

U.S. PATENT DOCUMENTS

| | | | |
|---|---|---|---|
| 6,514,184 B2 * | 2/2003 | Oitaka | B23Q 3/15526 483/68 |
| 7,575,543 B1 * | 8/2009 | Sun | B23Q 3/15526 483/68 |
| 8,632,447 B2 * | 1/2014 | Sun | B23Q 3/1572 483/68 |
| 2005/0032615 A1 | 2/2005 | Sato et al. | |
| 2014/0031184 A1 | 1/2014 | Lechleiter et al. | |
| 2014/0274626 A1 | 9/2014 | Sun | |

FOREIGN PATENT DOCUMENTS

| | | |
|---|---|---|
| DE | 9414140 U1 | 10/1994 |
| DE | 602004006678 T2 | 10/2007 |
| DE | 102012213207 A1 | 1/2014 |
| DE | 202015000661 U1 | 2/2015 |
| JP | S61-54438 U | 4/1986 |
| JP | 61-136750 A * | 6/1986 |
| JP | H11-48075 A | 2/1999 |
| JP | 2004-160595 A | 6/2004 |
| JP | 2005-081448 A * | 3/2005 |

OTHER PUBLICATIONS

Nov. 25, 2016 European Partial Search Report issued in Patent Application No. 16153955.6.
Dec. 15, 2015 Office Action issued in German Patent Application No. 102015291779.6.

* cited by examiner

CHAIN LINK FOR A LINK CHAIN AND TOOL MAGAZINE WITH LINK CHAIN

The present invention relates to a chain link for a link chain, comprising a base area which is confined by four sides, a first link portion along a first side of the four sides for receiving a first connection element for connecting the chain link to a first adjacent chain link, wherein the first link portion defines a first axis of rotation of a rotary motion of the first adjacent chain link in relation to the chain link, a second link portion along a second side of the four sides, which is parallel to the first side and serves for receiving a second connection element for connecting the chain link to a second adjacent chain link, wherein the second link portion defines a second axis of rotation of a rotary motion of the second adjacent chain link in relation to the chain link, and a third link portion on a third side of the four sides for receiving a third connection element for connecting the chain link to a tool receptacle, wherein the third link portion defines a third axis of rotation of a rotary motion of the tool receptacle in relation to the chain link.

The invention also relates to a tool magazine for a machine tool, having a link chain made of a plurality of interconnected, equally formed chain links for tool transport, wherein a base area of each chain link is confined by four sides, a chain drive for the circulating movement of the link chain, a tool receptacle which is connected to a first chain link of the plurality of chain links on a third side of the four sides of the first chain link, wherein the tool receptacle has a tool receiving portion for receiving a tool and wherein in the case of a received tool the tool in the tool receptacle defines a tool axis, and a pivoting device for pivoting the tool receptacle in relation to the first chain link from a transport position to an exchange position.

BACKGROUND OF THE INVENTION

Machine tools are frequently equipped with a tool magazine to enable the processing of a workpiece by means of a plurality of tools. The tools which are not used at the moment are stored in the tool magazine. The tool magazine here has a tool magazine chain, on the individual chain links of which the tools are mounted. When a tool is disposed at a certain position in the tool magazine, it can be removed from the magazine at that position and transported to the work area of the machine tool to machine the workpiece. When the machining shall be continued by means of another tool at a later time, the tool magazine chain circulates until the other tool has reached the tool removal position and the current tool can be exchanged with the other tool.

The chain here usually moves on a course formed by two parallel paths which have equal length and the ends of which are interconnected via two opposite circular arcs.

However, such a system creates problems when a high magazine capacity for at least 60 tools is desired since the space required for the circulating movement of the chain and thus for the tool magazine is considerably increased. At the same rime, the stability of the magazine design is reduced when a substantially greater weight has to be set in motion due to the larger number of tools as soon as a tool exchange shall be carried out. Therefore, the speed of the tool exchange is limited.

SUMMARY OF THE INVENTION

Therefore it is an object of the present invention to provide a tool magazine for a machine tool, said tool magazine serving for realizing a high magazine capacity and a compact magazine design, wherein the structure simultaneously has a high stability with respect to both the circulating movement of the chain and the tilting movement of the tool from a transport position of the tool to an exchange position of the tool.

This object is achieved by a chain link for a link chain according to an embodiment and by a tool magazine according to an embodiment.

The chain link according to the invention for a link chain comprises: a base area which is confined by four sides, a first link portion along a first side of the four sides for receiving a first connection element for connecting the chain link to a first adjacent chain link, wherein the first link, portion defines a first axis of rotation of a rotary motion of the first adjacent chain link in relation to the chain link, a second link portion along a second side of the four sides, which is parallel to the first side and serves for receiving a second connection element for connecting the chain link to a second adjacent chain link, wherein the second link portion defines a second axis of rotation of a rotary motion of the second adjacent chain link in relation to the chain link, and a third link portion on a third side of the four sides for receiving a third connection element for connecting the chain link to a tool receptacle, wherein the third link portion defines a third axis of rotation of a rotary motion of the tool receptacle in relation to the chain link, wherein the first axis of rotation and the second axis of rotation define a first plane, wherein the first plane runs parallel to the base area of the chain link and the third axis of rotation lies outside the first plane.

The chain link has three principal inertia axes, each of which is the normal to one of three cross-sectional areas of the chain link. The base area of the chain link is the cross-sectional area of the three cross-sectional areas that has the largest surface area among the three cross-sectional areas. Therefore, the chain link is substantially flat, wherein both the length and the width of the chain link are substantially greater than the height of the chain link. The base area of the chain link is thus defined by the length and the width of the chain link and not by the height of the chain link.

Due to its flat shape which furthermore needs not to be massive but can also be perforated, such a chain link is compact, light-weight and yet stable. It can be connected very easily on two opposite sides (on the first side and on the second side of the chain link) to a respective other chain link via the respective link portions so as to form a link chain from many chain links. In this connection, two interconnected link portions can be formed e.g. as a hinge joint, wherein the connection element can be a simple pin which is put through the two link portions, thus interconnecting them.

The chain link according to the invention thus lies flat in the chain. In other words, the base area of each chain link of the chain is perpendicular to the area enclosed by the chain. With such an orientation of the chain links in the chain and such a connection of the chain links to one another, a uniform pull on the chain links and a high tensile strength of the chain are achieved, as a result of which even a long chain having many chain links and many tool receptacles attached thereto and tools can circulate at high speed.

Furthermore, the receptacle link on the third side of the chain link does not lie in the plane which is defined by the two links on the first and second sides of the chain link, which connect the chain link to the two adjacent chain links. As a result, the tool receptacle can be attached to the chain link in such a way that it can be pivoted between two positions with respect to the chain link, the tool tilting moment is well supported and easy access to the receptacle and the pivot engagement point and locking latches as well as the tool in the receptacle is possible in every position. In the first position (transport position), the longitudinal axis of the tool receptacle is substantially parallel to the base area of the chain link. A tool receptacle in the transport position is thus aligned substantially in parallel to the floor on which the tool magazine with the chain made of chain links according to the invention is placed. Ail tool receptacles which are attached to the chain are in this position when the chain is set into a circulating movement. When the tool receptacle with the desired tool is at a position in the chain where the tool can be removed from the magazine, the receptacle is pivoted from the transport position by 90° to the exchange position, in the exchange position, the receptacle is orientated substantially perpendicular to the floor. Thus, all receptacles of the tool magazine are always disposed next to the respective chain link to which they are attached and/or also always next to the chain irrespective of whether they are in transport position or in exchange position. It is thus possible to support the chain in the tool magazine in such a way that if has bends which are curved in different directions (counter-bend of the chain). This means that during an entire chain circulation the angle is changed which is formed by the base areas of two adjacent chain links, wherein both angles of less than 180° and angles of greater than 180° are reached. This serves for achieving a better space utilization for the tool storage in the magazine because a plurality of windings of the chain can be guided on top of one another, as distinguished from e.g. a circular or elliptical circulation. This becomes possible due to the fact that the tool receptacles cannot interfere with the counter-bend of the chain since a tool receptacle is always disposed next to the chain link where it is attached and not e.g. above or below the chain link. The magazine can be kept very compact in this way.

The chain link is preferably trapezoidal, wherein the first side is the shortest side of the trapezoid.

Therefore, the chain link can have a triangular shape with cut-off tip. Due to its shape and the continuous connection between the links for connection to adjacent chain links, such a chain link has high strength, low springiness in the circulating movement of the chain link and in the pivot movement of the receptacle and a high load carrying capacity.

It is preferred for the chain link to also have a first continuous opening from a first position on the third side to a second position on the fourth side.

Such a center passage through the chain link enables the access to the receptacle and to the tool in the receptacle through the chain link in such a way that the receptacle can be fixed in the transport position and the tool can be easily locked and unlocked.

The second link portion preferably consists of a first link portion part and a second link portion part. Furthermore, a distance between the first link portion part and the second link portion part here preferably corresponds to the size of the first link portion.

The advantage is that two chain links can be connected to each other in a simple and stable fashion by putting the first link portion of the first chain link into the second link portion of the second chain link and then puffing a pin through the link portions formed as link sleeves.

The chain link is preferably an integral part and the chain link preferably consists of a plastic material or metal.

An integral chain link has the advantage that the production can be carried out in a rapid, simple and cost-efficient manner since it can be produced e.g. as an injection molded part by casting. In addition, another mechanical machining step, e.g. chip-producing finishing treatment, is no longer necessary to connect the chain links.

The chain link preferably also has a first rolling bearing receiving portion on the second link portion to receive a first rolling bearing, a second rolling bearing receiving portion to receive a second rolling bearing and a third rolling bearing receiving portion to receive a third rolling bearing, wherein the second rolling bearing receiving portion and the third rolling bearing receiving portion define an axis which is perpendicular to the base area of the chain link and wherein the second rolling bearing receiving portion, and the third rolling bearing receiving portion are formed on opposite sides of the base area of the chain link.

The rolling bearing arrangement of the chain offers the advantage of low friction in the circulating movement of the chain, which is, in turn, advantageous in the case of a high magazine capacity and with a correspondingly great weight of chain and receptacles. The required drive power is lower in the case of a rolling bearing arrangement than e.g. in the case of a plain bearing arrangement. A stable bearing arrangement and good support of each individual chain link is achieved via the rolling bearing arrangement on the rear side of the chain link and on the fop part and the bottom part of the chain link, especially when the chain link takes a curve in the magazine. In addition, the first and second rolling bearing receiving portions are formed on the chain link in such a way that the first rolling bearing and the second rolling bearing can be attached to the chain link perpendicularly to one another, as a result of which it is also possible to receive forces which are perpendicular to one another. The second rolling bearing and the third rolling bearing at the top and bottom of the chain link together receive the weight force of the tool, which is transferred via the link between receptacle and chain link to the chain link as a tilting moment.

The tool magazine according to the invention for a machine tool comprises: a link chain including a plurality of interconnected equally formed chain links for tool transport, wherein a base area of each chain link is confined by four sides, a chain drive for the circulating movement of the link chain, a tool receptacle which is connected to a first chain link of the plurality of chain links on a third side of the four sides of the first chain link, wherein the tool receptacle has a tool receiving portion for receiving a tool and wherein, with received tool, the tool in the tool receptacle defines a tool axis, and a pivot device for pivoting the tool receptacle in relation to the first chain link from a transport position to an exchange position, wherein in the transport position, the tool receptacle extends a distance from a first position on a fourth side of the four sides of the first chain link, which side is opposite to the third side, to a second position on the third side of the first chain link by a length of the tool receptacle in the direction of the tool axis.

The chain link has three principal inertia axes, each of which is the normal with respect to one of three cross-sectional areas of the chain link. The base area of the chain link is the cross-sectional area of the three cross-sectional areas that has the largest surface area among the three cross-sectional areas.

Therefore, the receptacle of the tool magazine according to the invention is oriented in the transport position in a direction perpendicular to the direction, in which the chain links are strung together. Thus, a chain portion consisting of some few chain links and receptacles attached thereto has a substantially flat or planar form, as a result of which a bend of the chain in two opposite directions (counter-bend) is still possible even if the tool receptacles are attached to a plurality of adjacent chain links. Furthermore, it is possible by means of the tool magazine according to the invention to strongly bend the chair, locally, i.e. strongly twist a plurality of adjacent chain links at the respective links against one another, as a result of which the tool magazine can be built in an even more compact way.

In both the transport position and the exchange position, the tool receptacle preferably only adjoins the third side of the four sides of the first chain link.

Together with the first chain link, the tool receptacle is therefore substantially a longitudinal element in the transport position and a substantially L-shaped element in the exchange position. The regions of both the first chain link and the tool receptacle, which on account of the connection between chain link and receptacle are in contact with one another or are closely adjacent to each other are small regions in relation to the size of the receptacle and/or the chain link in every position of the receptacle. This ensures a major movability of adjacent chain links and also between receptacles and chain links without the individual parts hindering one another when the parts are twisted against one another, and therefore the chain together with the receptacles can circulate on tight curves in the tool magazine.

The chain links preferably define a transport plane and are positioned in the link chain in such a way that for each chain link the base area of the chain link is perpendicular to the transport plane.

Therefore, the chain links are arranged in horizontal fashion in the chain instead of being upright in the chain. As a result, a chain link can be connected to the adjacent chain links thereof in such a way that in both the forward circulation of the chain and the backward circulation a chain link has a uniform pull, even in the curves of the chain supported in the tool magazine. This increases the stability of the arrangement in the case of large additional weights by a large number of tools in the magazine and at high circulation speeds.

The direction of curvature of the link chain preferably changes.

The advantage is that a chain with counter-bend can be provided in the tool magazine. Therefore, the area surrounded by the chain can be O-shaped but also be e.g. substantially C-shaped. A tool magazine with C-shaped chain can hold approximately twice as many tools as an equally sized magazine having an O-shaped chain.

Preferably, the first chain link has a first continuous opening from a third position on the third side to a fourth position on the fourth side and the tool receptacle has a second continuous opening in the direction of the tool axis, wherein in the transport position the first continuous opening and the second continuous opening adjoin each other and form a continuous opening through the first chain link and the tool receptacle.

As a result of the second continuous opening in the tool receptacle, the receptacle end facing the chain link is formed as a tube. The advantage is that the interior of the tool receptacle is accessible through the chain link from a chain link side facing away from the receptacle. As a result, e.g. the tool can be ejected from the receptacle by inserting a rod-like element, e.g. a cylinder, in the tubular receptacle or a rod-like element can be put through chain link and receptacle, as a result of which the receptacle is fixed in the transport position. In the exchange position, the interior of the tool receptacle is accessible from above.

The link chain is preferably supported by a rolling bearing.

The rolling bearing arrangement of the chain offers the advantage of low friction in the circulating movement of the chain, which is, in turn, advantageous in the case of a high magazine capacity and a correspondingly great weight of chain and receptacle because the required drive power for the circulating movement is lower than in the case of a sliding bearing arrangement, for example.

The tool receptacle preferably has a rolling bearing receiving portion for receiving a third rolling bearing.

The tilting moment can be well maintained by the tool weight in the transport position by a rolling bearing on the receptacle. In this connection, it is advantageous for the third rolling bearing on the receptacle to be aligned in the transport position substantially in parallel to the two rolling bearings on the upper side and lower side of the chain link (second and fourth rolling bearings). However, in the transport position the rolling bearing axis of the third rolling bearing can also adopt an angle of up to 45° with respect to the axis which is defined by the second and fourth rolling bearings.

The tool receptacle preferably has a tool locking portion for locking and unlocking the tool.

The tool locking portion can be formed as a locking tube or locking bore and serves for receiving locking elements, such as springs and balls for locking the tool. Furthermore, the tool receptacle can have one or more of these groups of tubes, such that the springs and balls for locking can be mounted in such a way that various tool types can be retained in the tool receptacle, e.g. SK, CAT or BT tools.

Furthermore, the tool magazine preferably has a stop portion for aligning the tool receptacle in the exchange position.

The tool receptacle can be aligned by means of the stop portion precisely in the exchange position in such a way that the tool is quickly gripped by a gripper and can be moved to the work area of the machine tool in order to exchange the tool. Furthermore, the last used tool can be quickly returned to the receptacle when the tool receptacle is aligned appropriately.

In this connection, the stop portion preferably has a connection for connecting a cleaning device for cleaning the tool receptacle, wherein a second opening of the tool receptacle is in contact with the stop portion when in the exchange position.

The advantage is that the stop portion can be used in two ways, once for a more precise alignment of the receptacle and in addition to clean the receptacle in the exchange position. As a result, the overall structure of the machine tool is further reduced in size.

The tool magazine according to the invention preferably has a link chain made of chain links according to the invention, wherein in the transport position the tool axis lies in the first plane of the first chain link.

As a result, the receptacle and the first chain link have substantially equal height when in the transport position. This enables a counter-bend of the chain and thus a more compact tool magazine.

In this connection, the receptacle preferably has an engagement portion for engaging the pivot device, wherein the engagement portion is formed as a longitudinal element, the longitudinal axis of which is parallel to the third axis of rotation of the first chain link.

With this form and position of the pivot device engaging portion on the receptacle, the lifting mechanism for the tool receptacle, which returns the tool receptacle from the exchange position back to the transport position, can be displaced to the tool magazine side which faces away from the machine and which is readily accessible. In addition, short gripper arms are sufficient in this case for pivoting the receptacle between the exchange position and the transport position.

Furthermore, there is provided a machine tool which has a tool magazine according to the invention and the cleaning device for cleaning the tool receptacle.

DETAILED DESCRIPTION OF THE FIGURES AND PREFERRED EXEMPLARY EMBODIMENTS OF THE PRESENT INVENTION

In the following, the present invention is specified and explained by means of exemplary embodiments and the exemplary figures.

Figure 1:
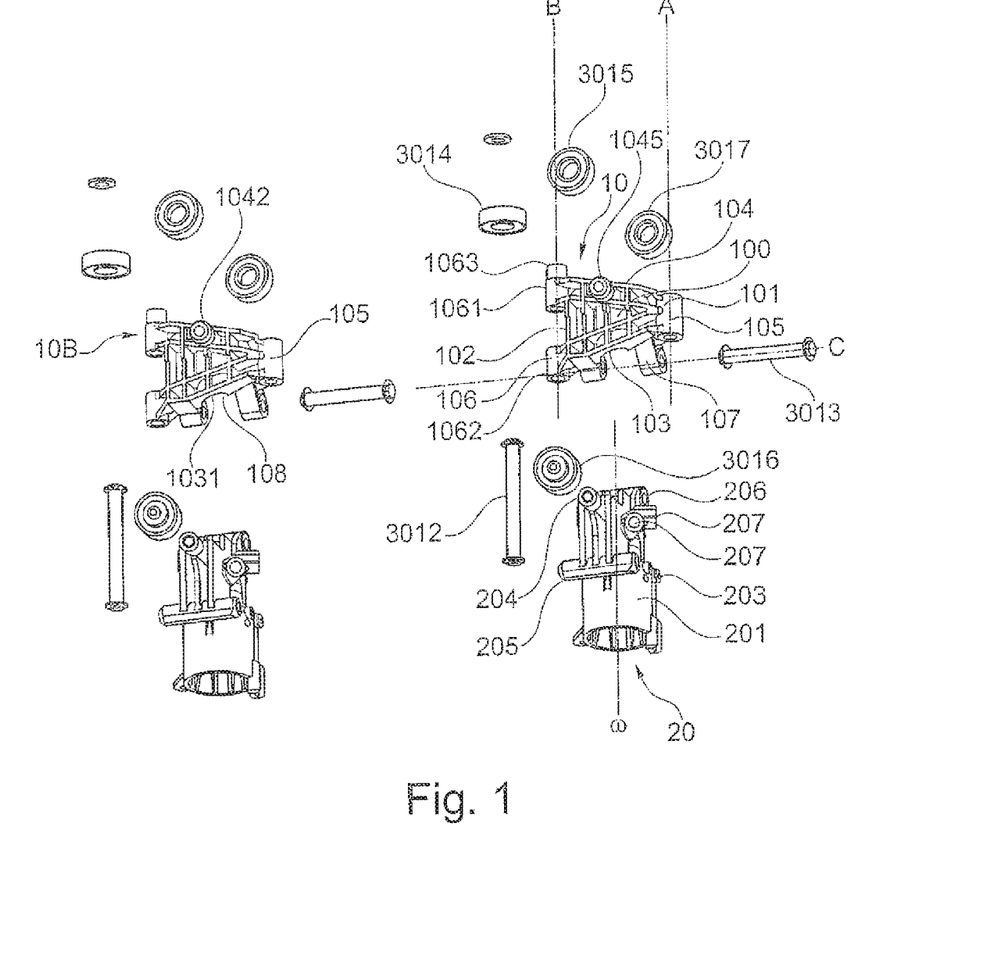
FIG. 1 shows an exploded view of an exemplary embodiment having a plurality of chain links according to the invention and tool receptacles.

FIG. 1 shows an exemplary embodiment of a chain link 10 according to the invention and the relative arrangement thereof with respect to an adjacent chain link 10B as well as two tool receptacles 20 without tool. Also shown are the connection element 3012 which is made as a pin and serves for connecting the chain links 10 and 10B, the connection element 3013 which is made as a pin and serves for connecting the chain link 10 to a receptacle 20 and the rolling bearings 3014-3016 for supporting the chain links 10, 10B and the receptacles 20.

The chain link 10 has a planar shape, wherein the base area 100 thereof has the shape of a trapezoid or a triangle with cut-off tip. The base area 100 is confined by four sides 101-104, wherein the first side 101 is the shortest side of the trapezoid and is parallel to the second side 102. The first and second sides 101, 102 accommodate respectively a first link portion and a second link portion 105, 106 for connection to a first adjacent chain link 10A (not shown) on the first side 101 and for connection to a second adjacent chain link 10B on the second side 102. The link portions 105, 106 are formed as link sleeves of a hinge joint, and therefore connecting pins 3011 (not shown), 3012 can be put through the link sleeves. The second link portion 106 on the second side 102 here consists of two spatially separated portions, i.e. a first link portion part 1061 on one end of the second side 102, which is simultaneously also the end of the fourth side 104 of the base area 100, and a second link portion part 1062 at the other end of the second side 102, which is simultaneously also the end of the third side 103 of the base area 100. Here, each of the first link portion part and the second link portion part 1061, 1062 is formed as a link sleeve, wherein the distance between the link sleeves 1061, 1062 is dimensioned in such a way that the link sleeve 105 of an adjacent chain link 10B fits between the link sleeves 1061, 1062. In order to connect the chain links 10, 10B, a pin 3012 is then put through the link sleeves 1061, 105, 1062 of the chain links 10 or 10B so as to form a hinge joint. The first link portion 105 on the first side 101 defines a first axis of rotation A, about which the chain link 10A (not shown) can be rotated in relation to the chain link 10, and the second link portion 106 on the second side 102 defines a second axis of rotation B, about which the chain link 10B can be rotated in relation to the chain link 10. The axes of rotation A, B are parallel and are at an equal height with respect to the base area 100 of the chain link 10.

Furthermore, the first link portion part 1061 of the second link portion 106 has a first rolling bearing receiving portion 1063, and therefore a rolling bearing 3014 can be put on the first link portion part 1061. Alternatively, the rolling bearing 3014 can also be put on the connecting pin 3012. On the fourth side 104, a second rolling bearing receiving portion 1045 is found approximately in the center of the side 104, and therefore a rolling bearing 3015 can be put on the upper side of the chain link 10 on the second rolling bearing receiving portion 1045. Furthermore, a rolling bearing 3017 can be put on the lower side of the chain link 10 on a third rolling bearing receiving portion 1046 which is opposite the rolling bearing receiving portion 1045. The put-on rolling bearings 3015, 3017 are oriented perpendicularly to the rolling bearing 3014, and therefore the rolling bearing arrangement can also receive forces which are perpendicular to each other. Both rolling bearings 3015 and 3017 are required since they together receive the weight force of the tool 40, which is transmitted via the receptacle-chain link-joint 107, 206 as a tilting moment to the chain link 10. For this purpose, the rolling bearing receiving portions 1045, 1046 are formed for the rolling bearings 3015, 3017 usefully as a journal in each case, which with respect to the base area 100 of the chain link 10 point upwards and downwards and thus define an axis which is perpendicular to the base area 100 of the chain link 10. Here, the rolling bearing receiving portions 1045, 1046 do not have to be formed on the fourth side 104 of the chain link 10 but can also be displaced into the interior of the chain link 10.

The chain link body can be made of plastic material or metal and is formed as an integral part. The chain link body consists of a plurality of struts which continuously interconnect the respectively opposite sides 101, 102 and 103, 104 of the chain link 10 in the plane of the link portions 105 and 106. Here, the struts which connect the sides 103 and 104 are parallel to each other and to the sides 101, 102 and the struts which connect the sides 101 and 102 are parallel to one of the sides 103, 104. In this connection, the chain link body has a plurality of openings which extend from fop to bottom through the base area 100. As a result, the chain link 10 can be produced in simple and cost-effective fashion by casting, has a very light weight and is very stable.

On the third side 103 of the base area 100, a third link portion 107 is disposed which also consists of two parts on the respective ends of the third side 103, wherein both parts of the third link portion 107 are formed as link sleeves. The distance between the two parts is dimensioned in such a way that the link portion 206 of the tool receptacle 20 fits between the two parts, and therefore the link portion 107 of the chain link 10 and the link portion 206 of the receptacle 20 can be connected to establish a hinge joint by means of a pin 3013. The link portion 107 of the chain link 10 thus defines a third axis of rotation C, about which the tool receptacle 20 can be rotated relative to the chain link 10. The axis of rotation C is oriented substantially perpendicularly to the axes of rotation A and B. Since the axis of rotation C is deeper with respect to the base area 100 than the axes of rotation A and B, the axis of rotation C does not intersect the axes of rotation A and B.

The receptacle 20 for connection to the chain link 10 has, in addition to the link portion 206, a tool receiving portion 201 which is formed in such a way that if can receive a tool cone of a tool 40 (not shown). The received tool 40 then protrudes from an end of the receptacle 20, which faces the end of the receptacle 20 where the link portion 206 is disposed. The longitudinal axis of the received tool 40 defines a tool axis W in the receptacle 20. The outer side of the tool receptacle 20 has a plurality of locking tubes or bores 207 which receive the springs and balls for locking the tool 40 in the tool receptacle 20. Furthermore, the outer side of the receptacle 20 has a rolling bearing receiving portion 204 on which a rolling bearing 3016 can be put. The rolling bearing receiving portion 204 is made as a journal. The rolling bearing 3016 serves for keeping the tilting moment of the receptacle 20 in the transport position. On the outer side of the receptacle 20, approximately in the center between the two receptacle ends, there is also disposed an engagement portion 205 for engaging the pivot device 303 (not shown) which pivots the receptacle 20 in relation to the chain link 10 about the axis of rotation C. Furthermore, the receptacle 20 has additional openings 203, by means of which the interior of the receptacle can be blown out with compressed air and can be cleaned from dust particles.

Figure 2:
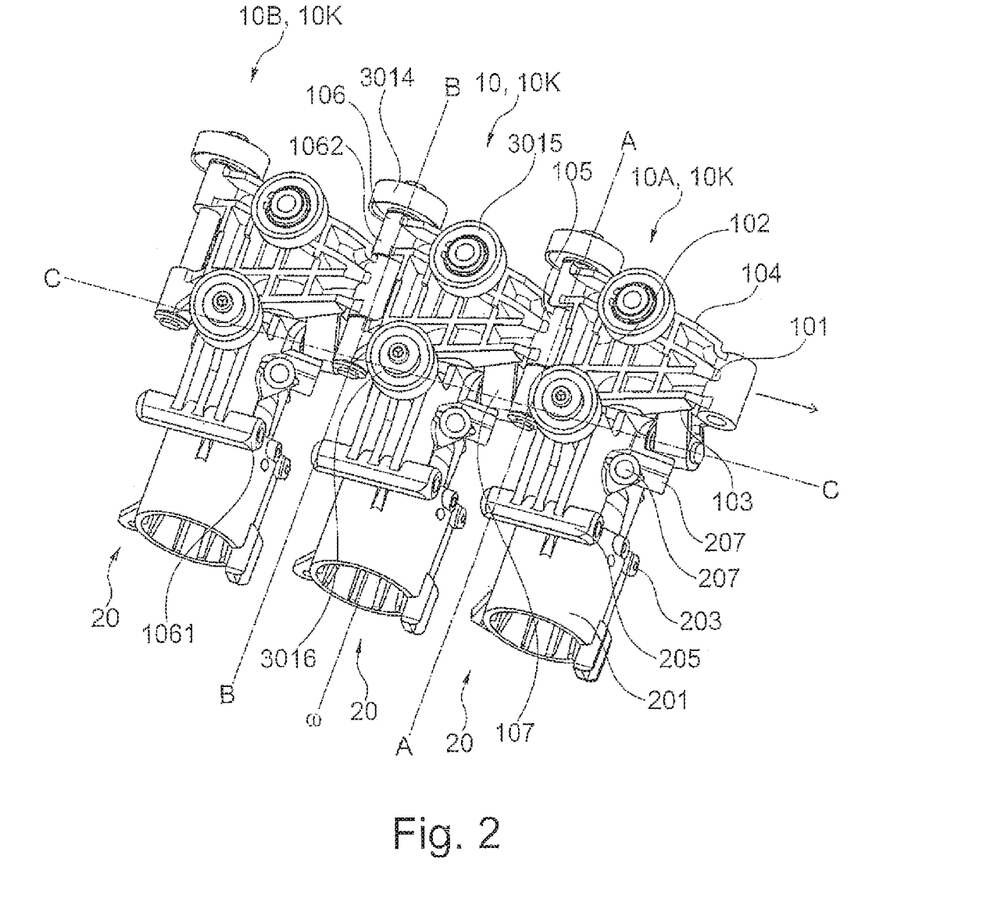
FIG. 2 shows an exemplary embodiment having a plurality of connected chain links according to the invention and tool receptacles in the transport position.

FIG. 2 shows three interconnected chain links 10, 10A, 10B according to the invention, wherein one tool receptacle 20 is mounted on each chain link 10, 10A, 10B. Therefore, the chain links 10, 10A, 10B form a section of a link chain 301. The middle chain link 10 is rotatably connected to the right-hand chain link 10A via a hinge joint which consists of the first link portion 105 of the central chain link 10, the second hinge portion 106 of the right-hand chain link 10A and the pin 3011. The first axis of rotation A extends along this hinge joint, wherein the chain link 10A can be rotated in relation to the chain link 10 about the axis of rotation A by a large angle upwards and downwards, without the two tool receptacles 20 of the chain links 10, 10A colliding. This is the precondition for the counter-bend of the link chain 301, which is composed of chain links 10 according to the invention.

Furthermore, the central chain link 10 is rotatably connected to the left-hand chain link 10B via another hinge joint which is composed of the second link portion 106 of the chain link 10, the first link portion 105 of the left-hand chain link 10B and the pin 3012. The second axis of rotation B extends along this additional hinge joint, wherein the chain link 10B can be rotated upwards and downward in relation to the chain link 10 about the axis of rotation B by a large angle, without the two tool receptacles 20 of the chain links 10, 10B colliding.

In FIG. 2, each chain link 10, 10A, 10B is connected to a respective tool receptacle 20 via a hinge joint. All receptacles 20 shown are in the transport position, which means that the tool axis W of each receptacle 20 is parallel to the axes of rotation A, B. Therefore, the receptacle 20 prolongs in the transport position an imaginary line from a first position 1041 on the fourth side 104 of the chain link 10, which is disposed approximately in the center of the fourth side 104, to a second position 1032 on the third side 103 of the chain link 10, which is approximately in the center of the third side 103, beyond the second position 1032 on the third side 103. The tool axis W has approximately the same distance to the axis of rotation A and to the axis of rotation B and is disposed with respect to the base area 100 of the chain link 10 at the same height as the axes of rotation A, B. As a result, it is not only the single chain link 10 that has a planar shape but also a portion from the link chain 301 that consists of a plurality of chain links 10, e.g. three chain links 10, and receptacles 20 attached to the chain links 10 when the receptacles 20 are in a transport position. Therefore, a chain portion of a plurality of chain links 10 plus receptacles 20 can be bent upwards and downwards. In a circulating movement of the link chain 301, which is installed in a tool magazine 30 of a machine tool, curves which are curved in opposite directions can be traversed. This means that the chain circulation path does not have to be O-shaped but can also contain a plurality of windings. In addition, this chain design distinguishes itself in a circulating movement of the chain 301 which corresponds to a pull in the direction of the arrow in FIG. 2 and in the case of a circulating movement in the opposite direction by high tensile strength and high load carrying capacity, which is a precondition for the fact that the tool magazine can receive a large number of tools.

Figure 3:
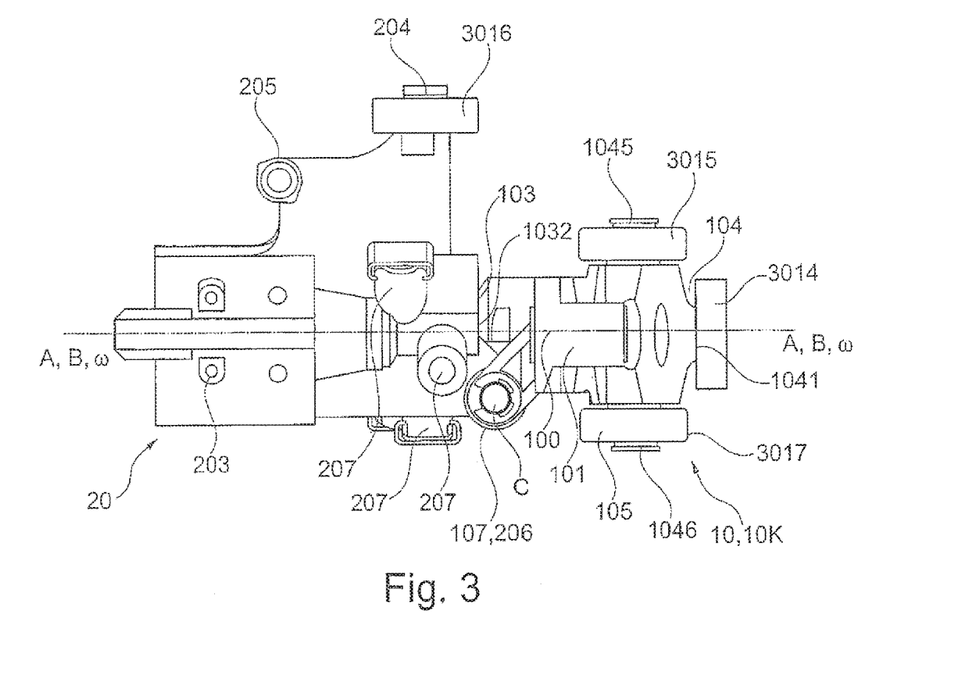
FIG. 3 shows a side view of an exemplary embodiment of a chain link according to the invention with a tool receptacle in a transport position.

FIG. 3 shows a side view of a chain link 10 according to the invention and an associated tool receptacle 20 in a transport position. The axes of rotation A, B and the tool axis W are at equal height with respect to the base area 100 of the chain link 10. The axis of rotation C extends perpendicularly to the axes A, B and W and in this view is disposed below the axes A, B, W and below the base area 100 since the third link portion 107 of the chain link 10 and the associated link portion 206 of the receptacle 20 are formed on the bottom side of the chain link 10 or on the bottom side of the receptacle 20. As a result, the receptacle 20 can be pivoted from the shown transport position by 90° downwards into the exchange position.

The tubular engagement portion 205, the axis of which is parallel to the receptacle pivot axis C, is formed on the receptacle 20 as an engagement point for the pivot device 303 (not shown), which pivots the receptacle 20 from the transport position to the exchange position and back. The engagement portion 205 on the receptacle 20 can also serve for holding the receptacle 20 in a certain position with respect to the chain link 10. In the illustrated view, the engagement portion 205 is disposed above the axes A, B, W and above the base area 100 on the side of the receptacle 20, which faces away from the chain link 10. Therefore, the engagement portion 205 can be easily accessed by the pivot device 303. In addition, the tool 40 (not shown) in the receptacle 20 is also easily accessible for the gripper device (not shown) which removes the tool 40 for a tool exchange from the receptacle 20 when the receptacle 20 is in an exchange position or returns a tool 40 to the receptacle 20 after the use thereof.

FIG. 3 also shows a plurality of tubular locking portions 207 on the outer side of the receptacle for locking the tool in the receptacle. The tool receptacle 20 has a plurality of these locking tubes 207 and/or a plurality of groups of tubes on the rear end thereof. Thus, differently shaped tools 40 can be fixed in the receptacle 20, and therefore a single embodiment of the receptacle 20 can receive different types of tools, such as SK, CAT or BT tools.

Furthermore, the chain link 10 has a continuous opening 108 through the chain link 10 along a line from a first position 1041 on the fourth side 104 of the base area 100, which faces way from the receptacle 20, to a second position 1032 on the third side 103 of the base area 100, which faces the receptacle 20. In addition, the receptacle 20 has a continuous opening 202 through the receptacle 20 along the tool axis W, and therefore the rear end of the receptacle 20 has a tubular shape. In the transport position, the continuous openings 108 and 202 of chain link 10 and receptacle 20 form a single continuous opening along the axis W. This opening 108, 202 can be used e.g. to keep the receptacle 20 in the transport position by means of the rod-shaped element, which is passed through the continuous opening 108, 202. Furthermore, by inserting a cylinder in the tubular rear end of the receptacle 20, the tool 40 can be ejected from the receptacle 20, also through the chain link 10. In addition, the weight of the chain link 10 is reduced by the continuous opening 108 in the chain link 10.

FIG. 3 also shows the position and orientation of the rolling bearings 3014-3017, which serve for supporting the link chain 301 in the tool magazine 30 and for receiving the tilting moment of the receptacle 20. In this exemplary embodiment, a rolling bearing 3014 is mounted on the corner of the second and fourth sides 102, 104 of the chain link 10. In addition, one rolling bearing 3015, 3017 each is attached to the top side or bottom side of the chain link 10 on the fourth side 104 of the base area 100 to receive together the tool weight force. These rolling bearings 3014, 3015, 3017 serve for supporting the link chain 301 and enable a low-friction circulating movement of the chain 301 in the tool magazine 30. The rolling bearing 3016 on the receptacle 20 serves for supporting the arrangement of the chain 301 in the chain circulation and for receiving the pivot moment or for stopping the pivot movement of the receptacle 20. For this purpose, the rolling bearing 3016 is usefully aligned parallel to the rolling bearings 3015 and 3017; however, the rolling bearing axis of bearing 3016 can also be tilted by up to 45° with respect to the rolling bearing axis of bearings 3015, 3017.

Figure 4:
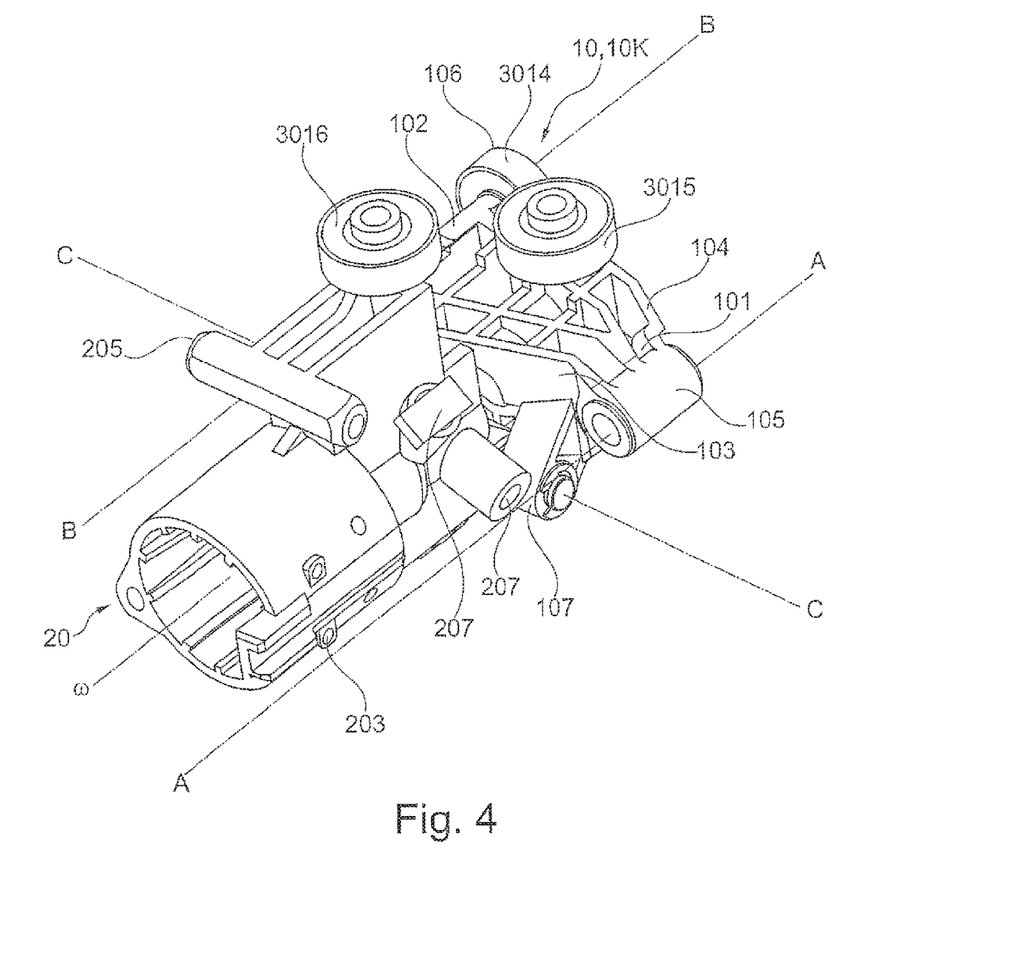
FIG. 4 shows an exemplary embodiment of a chain link according to the invention with a tool receptacle in a transport position obliquely from above.

FIG. 4 shows the chain link 10 and the receptacle 20 of FIG. 3 from another perspective for elucidating the relative positions of the axes of rotation A, B, C and the tool axis W. In this view, the tool axis W is disposed between the axes of rotation A and B. The axis of rotation C extends below the axes A, B and W and perpendicular thereto. Like the chain link 10, the receptacle 20 can be produced as an integral part and can be made of metal or a plastic material as an injection-molded part. The chain links 10 are connected to one another and to the receptacles 20 by a simple telescoping of the respective link portions 105, 106, 107, 206 and connecting pins 3011-3013 without another mechanical subsequent processing step being necessary.

Figure 5:
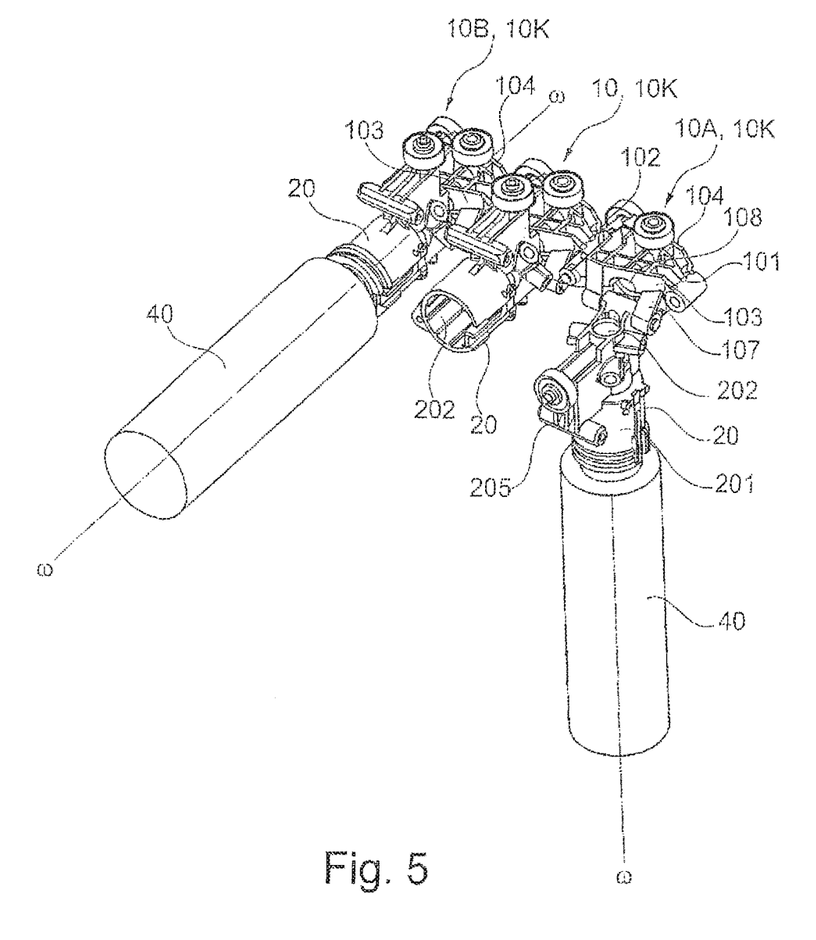
FIG. 5 shows an exemplary embodiment having a plurality of connected chain links according to the invention and tool receptacles in a transport position and an exchange position.

FIG. 5 shows a section of the link chain 301 with three chain links 10, 10A, 10B according to the invention, each of which is connected to a tool receptacle 20. The receptacles 20, which are connected to the chain links 10 and 10B, are in a transport position; the receptacle 20, which is connected to the chain link 10A, is in the exchange position. The receptacles 20 which are connected to the chain links 10A and 10B, accommodate one tool 40 each. FIG. 5 illustrates that when pivoting from the transport position to the exchange position, the tool axis W is pivoted downwards by 90°. In the exchange position, the axes A, C and W are thus oriented perpendicularly in pairs, wherein none of the axes A, C and W intersect. FIG. 5 shows the continuous openings 108, 202 of the chain link 10A and the receptacle 20 for the chain link 10A and the associated receptacle 20, which no longer form a single continuous opening in the exchange position.

Figure 6A:
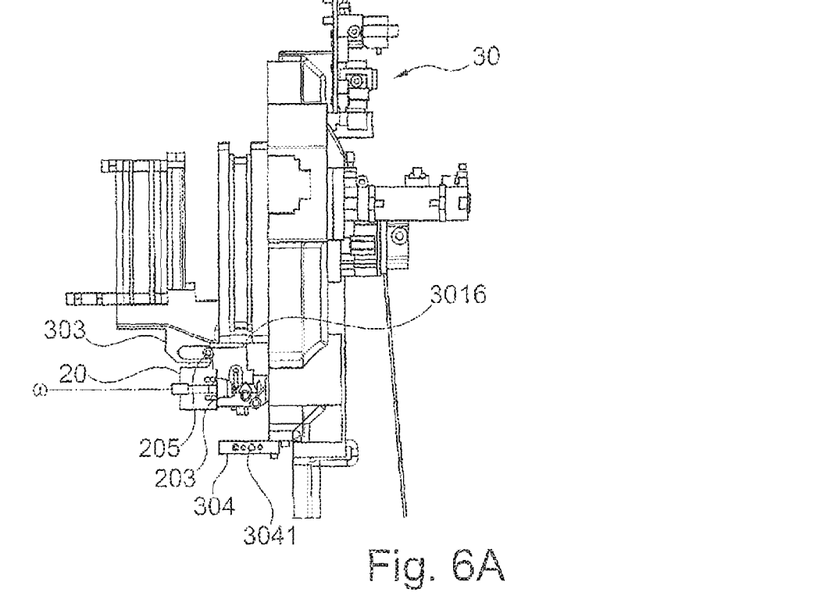
FIG. 6A shows an exemplary embodiment of a tool magazine according to the invention with a tool receptacle in the transport position.
Figure 6B:
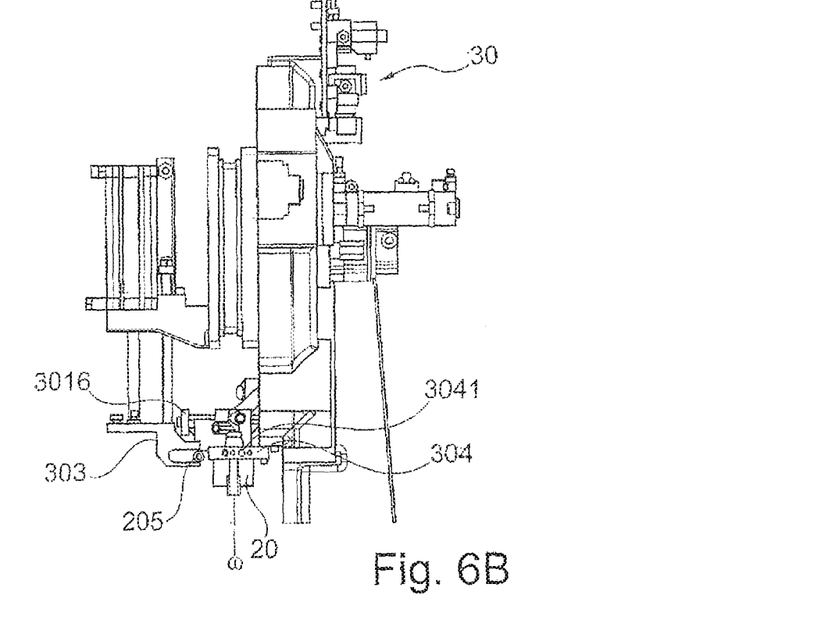
FIG. 6B shows an exemplary embodiment of a tool magazine according to the invention with a tool receptacle in the exchange position.

The pivoting operation of the receptacle 20 is shown in FIGS. 6A/B for a tool magazine 30 according to the invention. FIG. 6A shows the tool magazine 30, wherein the receptacle 20 is disposed at a place in the magazine 30 where the pivot movement is changed from a transport position of the receptacle 20 to an exchange position of the receptacle 20. During the circulating movement of the chain 301, all receptacles 20 of the magazine 30 are in the transport position. When in the circulating movement which can be carried out in two opposite directions, the desired tool 40 has been transported to the place in the magazine 30 where the tool exchange can be carried out, the receptacle 20 with the tool 40 is pivoted into the exchange position, as shown in FIG. 6B. This movement is carried out by means of a pneumatically operating pivot device 303 which engages the engagement portion 205 of the receptacle 20 and tilts the receptacle 20 downwards about the axis of rotation C. The pivot device 303 is disposed on a side of the tool magazine 30, which faces away from the machine; this means that the link chain 301 is disposed between the pivot device 303 and the machine tool (not shown). Since the pivot device 303 and the gripper device of the machine tool which carries out the tool exchange, engage opposite sides of the receptacle 20 when the receptacle 20 is in the exchange position, the required space is thus reduced for ail components. The tool magazine 30 plus the pivot device 303 can in addition be easily separated from the machine tool and can be transported to another machine tool.

Furthermore, the tool magazine 30 has a stop portion 304, which serves for stopping the pivot movement of the receptacle 20 and for aligning the receptacle 20 in the exchange position. The stop portion 304 is formed in such a way that it has a connection 3041 for connecting an external cleaning device 50 (not shown) on a side facing away from the receptacle 20. The interior space of the empty receptacle 20 in the exchange position can be blown out with compressed air through the holes in the stop portion 304 and the holes 203 in the receptacle 20 and is cleaned in this way.

Figure 7:
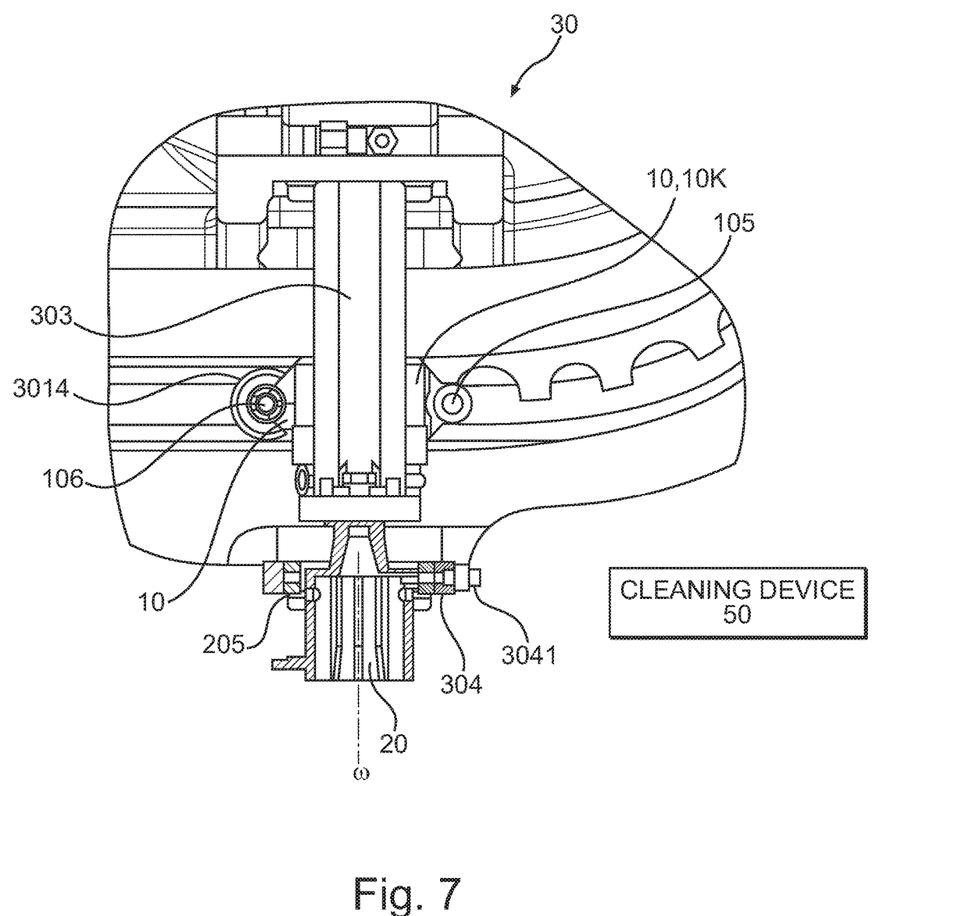
FIG. 7 shows an enlarged view of an exemplary embodiment of a tool magazine according to the invention with a tool receptacle in the exchange position.

FIG. 7 shows an enlarged portion of the chain link 10 and the associated receptacle 20 in the exchange position in the tool magazine 30. What is also shown is the pivot device 303 and also the stop portion 304 of the tool magazine 30 with the connection 3041 for the receptacle blow-out device 50. The chain link 10 is positioned at this place in the tool magazine 30 in the chain 301 in such a way that its base area 100 is parallel to the floor. Further chain links 10 connected to the chain link 10 are not shown in this view for a better overview.

Figure 8:
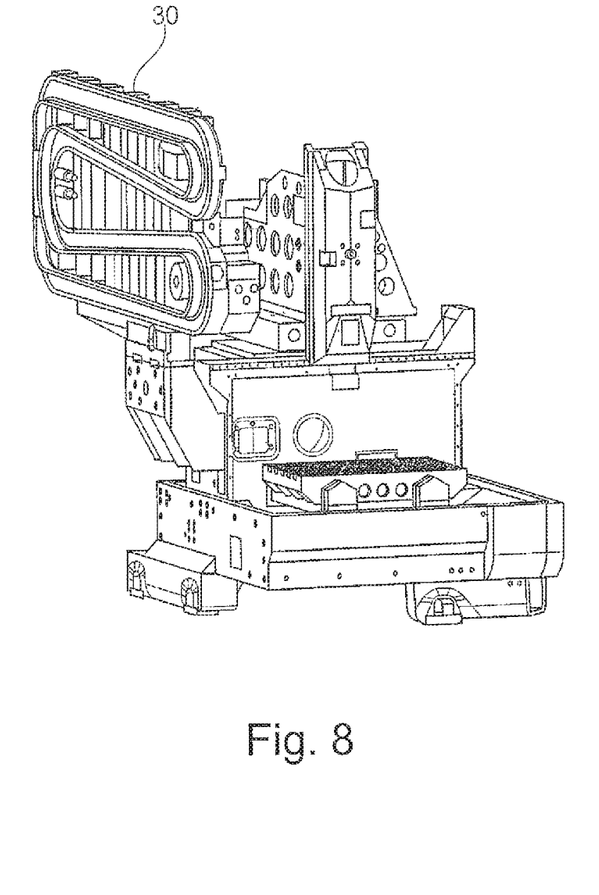
FIG. 8 shows an exemplary embodiment of a machine tool having a tool magazine according to the invention.
Figure 9:
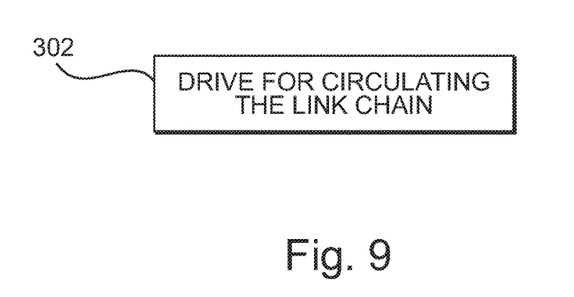
FIG. 9 schematically shows a portion of the invention.

FIG. 8 shows the structure of a machine tool and of a tool magazine 30 according to the invention for elucidating the circulating movement and the form of the link chain 301 supported in the magazine 30. The chain 301 itself is not shown. By means of a link chain 301 made of chain links 10 according to the invention and tool receptacles 20 attached thereto it is possible to have the chain 301 circulate by means of a chain drive 302 on a path as shown in FIG. 8. In this connection, the chain 301 can move forward or backward. The circulating path has several tight curves. By means of a link chain 301 made of chain links 10 according to the invention it is possible to also move the chain 301 along such tight curves since two adjacent chain links 10 can also be twisted, with receptacles 20 attached thereto, clockwise and counter-clockwise by a large angle against one another about the axes of rotation A and B. Therefore, a compact tool magazine 30 having a large tool capacity, e.g. for 60 to 120 tools, can be provided.

LIST OF REFERENCE SIGNS 10 chain link
10A first adjacent chain link
10B second adjacent chain link
10K first chain link
100 base area
101 first side
102 second side
103 third side
1031 first position on the third side
1032 second position on the third side
1033 third position on the third side
104 fourth side
1041 first position on the fourth side
1042 second position on the fourth side
1044 fourth position on the fourth side
1045 second rolling bearing receiving portion
1046 third rolling bearing receiving portion
105 first link portion
106 second link portion
1061 first link portion part
1062 second link portion part
1063 first rolling bearing receiving portion
107 third link portion
108 first continuous opening
20 tool receptacle
201 tool receiving portion of the tool receptacle
202 second continuous opening
203 second opening of the tool receptacle
204 rolling bearing receiving portion of the tool receptacle
205 engagement portion
206 link portion of the tool receptacle
207 locking portion
A first axis of rotation
B second axis of rotation
C third axis of rotation
W tool axis
30 tool magazine
301 link chain
3011 first connection element
3012 second connection element
3013 third connection element
3014 first rolling bearing
3015 second rolling bearing
3016 third rolling bearing
3017 fourth rolling bearing
302 chain drive
303 pivot device
304 stop portion
3041 connection
40 tool
50 cleaning device

The invention claimed is:

1. A tool magazine for a machine tool, the tool magazine comprising:
   a link chain including a plurality of associated chain links for tool transport;
   a drive configured to cause circulating movement of the link chain, each of the chain links including:
   a first side, at which a respective first link portion is located,
   a second side, at which a respective second link portion is located,
   a third side interconnecting the first side and the second side, a respective third link portion being located at the third side, and
   a fourth side interconnecting the first side and the second side,
   wherein the first link portion of one of the chain links is pivotally attached to the second link portion of a first adjacent one of the chain links to provide relative pivoting movement of the one of the chain links relative to the first adjacent one of the chain links about a respective first axis of rotation, and the second link portion of the one of the chain links is pivotally attached to the first link portion of a second adjacent one of the chain links to provide relative pivoting movement of the one of the chain links relative to the second adjacent one of the chain links about a respective second axis of rotation,
   a respective tool receptacle pivotally attached to the respective third link portion of each of the chain links to provide pivoting movement of the respective tool receptacle relative to the corresponding chain link about a respective third axis of rotation, each of the respective tool receptacles having a respective tool receiving portion to receive a tool and each of the received respective tools define a respective longitudinal tool axis; and
   a pivot device pivoting the tool receptacle of the one of the chain links in relation to the one of the chain links about the respective third axis of rotation from a transport orientation, in which the respective longitudinal tool axis is parallel to the respective first axis of rotation and the respective second axis of rotation of the one of the chain links, into an exchange orientation, in which the respective longitudinal tool axis is perpendicular to the respective first axis of rotation and the respective second axis of rotation of the one of the chain links, wherein:
   each of the chain links includes a respective first through-opening extending from the respective third side to the respective fourth side,
   each of the tool receptacles includes a respective second through-opening, and
   when a predetermined one of the tool receptacles is in the respective transport orientation, the respective first through-opening and the respective second through-opening of the predetermined one of the tool receptacles border on one another and form a continuous opening through the corresponding chain link and corresponding tool receptacle, and when the predetermined one of the tool receptacles is in the respective exchange orientation, the respective first through-opening and the respective second through-opening do not border one another to form the continuous opening.

2. The tool magazine according to claim 1, wherein each of the chain links is trapezoidal, and
for each of the chain links, the first side of each chain link is a shortest side of the trapezoid.

3. The tool magazine according to claim 1, wherein
for each of the chain links, the second link portion consists of a respective first link portion part and a respective second link portion part, and
a distance between the first link portion part and the second link portion part corresponds to a size of the first link portion of each of the chain links.

4. The tool magazine according to claim 1, wherein each of the chain links consists of a plastic material or metal.

5. The tool magazine according to claim 1, wherein:
each of the chain links further comprises:
   a respective first rolling bearing receiving portion on the respective second link portion for receiving a respective first rolling bearing,
   a respective second rolling bearing receiving portion for receiving a respective second rolling bearing, and
   a respective third rolling bearing receiving portion for receiving a respective third rolling bearing,
each of the second rolling bearing receiving portions and each of the third rolling bearing receiving portions define a respective axis which is perpendicular to the base area of the corresponding chain link, and
each of the second rolling bearing receiving portions and each of the third rolling bearing receiving portions are formed on opposite sides of a respective base area of the corresponding chain link.

6. The tool magazine according to claim 1, wherein the first axis of rotation and the second axis of rotation of the one of the chain links are coplanar.

7. The tool magazine according to claim 1, wherein the chain links define a transport plane.

8. The tool magazine according to claim 1, wherein as the link chain circulates, the chain links travel along a path having a plurality of curves.

9. The tool magazine according to claim 1, wherein link chain is supported by a rolling bearing.

10. The tool magazine according to claim 1, each of the tool receptacles has a respective rolling bearing receiving portion to receive a respective rolling bearing.

11. The tool magazine according to claim 1, each of the respective tool receptacles has a locking portion to lock and unlock the corresponding tool.

12. The tool magazine according to claim 1, further comprising a stop portion to orientate a predetermined one of the tool receptacles in the exchange orientation.

13. The tool magazine according to claim 12, wherein the stop portion has a connection to connect an additional opening of a predetermined one of the tool receptacles and a cleaning device to clean the predetermined one of the tool receptacles, and the additional opening of the predetermined one of the tool receptacles is in contact in the exchange orientation with the stop portion.

14. The tool magazine according to claim 1, wherein:
the chain links each further comprise a respective base area which is confined by the four sides,
for each of the chain links, the respective first axis of rotation and the respective second axis of rotation define a respective first plane, the respective first plane being parallel to the respective base area of the respective chain link,
the respective third axis of rotation is located outside the respective first plane, and
when the respective tool receptacle is in the transport orientation, the respective longitudinal tool axis is located in the respective first plane of the respective first chain link.

15. The tool magazine according to claim 14, wherein:
each of the tool receptacles has a respective engagement portion to engage the pivot device, and
each of the engagement portions are formed as a respective longitudinal element, a respective longitudinal axis of the respective longitudinal element is parallel to the corresponding third axis of rotation of the corresponding chain link.

16. The machine tool comprising:
the tool magazine according to claim 1, and
a cleaning device to clean a predetermined one of the tool receptacles.

* * * * *